Dec. 12, 1967  G. W. TORRENCE  3,357,129
PLANT WATERING SYSTEMS AND CONTROL MEANS THEREFOR
Filed June 17, 1966  2 Sheets-Sheet 1

INVENTOR.
GEORGE W. TORRENCE,
BY
Berman, Davidson & Berman
ATTORNEYS.

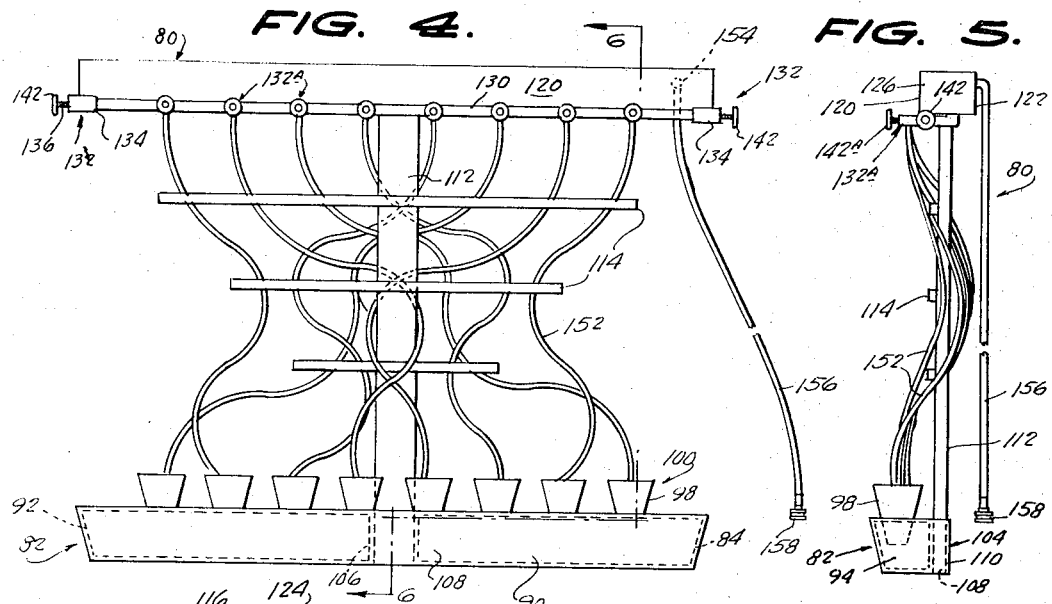
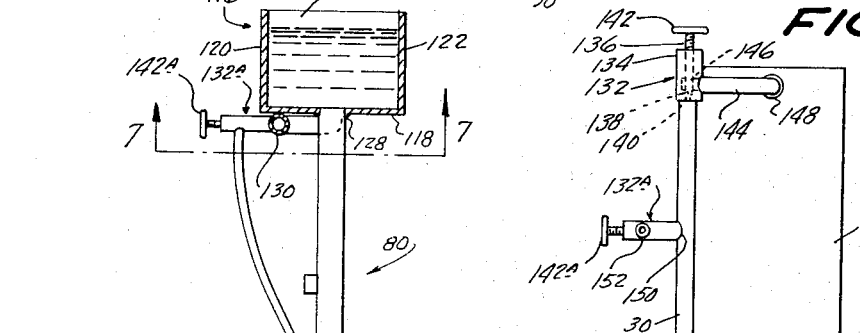
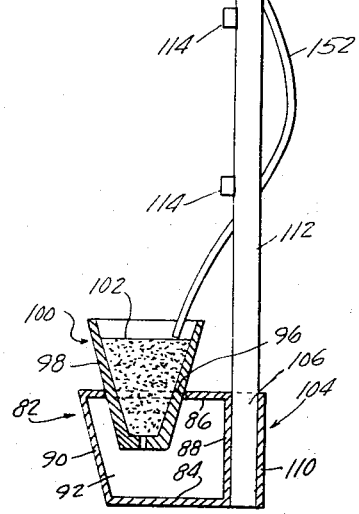

3,357,129
PLANT WATERING SYSTEMS AND CONTROL
MEANS THEREFOR
George W. Torrence, 829 N. Dupont St.,
Wilmington, Del. 19805
Filed June 17, 1966, Ser. No. 558,422
7 Claims. (Cl. 47—38)

This invention relates to plant watering systems in general, and more specifically, the invention pertains to the provision of such systems as are used in the watering of but a single or a plurality of plants as desired.

One of the primary objects of this invention is to provide a plant watering system for one or a plurality of potted plants arranged substantially in bank, wherein the system includes a water reservoir or header connected by individually valve-controlled conduits with the soil of each potted plant.

Another object of this invention is to provide watering means for a great number of plants which are individually potted and disposed to occupy a relatively small space together with means for controlling the water supply to each of the potted plants in accordance with its individual demands.

A further object of this invention is to provide a watering system for potted plants of the type generally described above, together with means so disposed and arranged as to effectively hide or conceal the watering means as the plant growths achieve maturity.

It is still another object of this invention to provide in conjunction with the water system and the concealment means, support means of a trellis type for supporting the plant growths as the same approach their respective maturities.

This invention contemplates, as a still further object thereof, the provision of means of the type generally referred to supra, the means being relatively non-complex in construction and assembly, inexpensive to manufacture and maintain, and which is rugged and durable in use.

Other and further objects and advantages of the instant invention will become more manifest from a consideration of the following specification when read in conjunction with the annexed drawings, in which:

FIGURE 4 is a front elevational view of a second embodiment of the watering system and plant support means;

FIGURE 5 is a side elevational view of the watering system and plant support means as shown in FIGURE 4;

FIGURE 6 is a detail vertical transverse cross-sectional view, partly in elevation, FIGURE 6 being taken substantially on the vertical plane of line 6—6 of FIGURE 4, looking in the direction of the arrows; and FIGURE 7 is a fragmentary bottom plan view, FIGURE 7 being taken substantially on the horizontal plane of line 7—7 of FIGURE 6, looking in the direction of the arrows.

Figure 1:
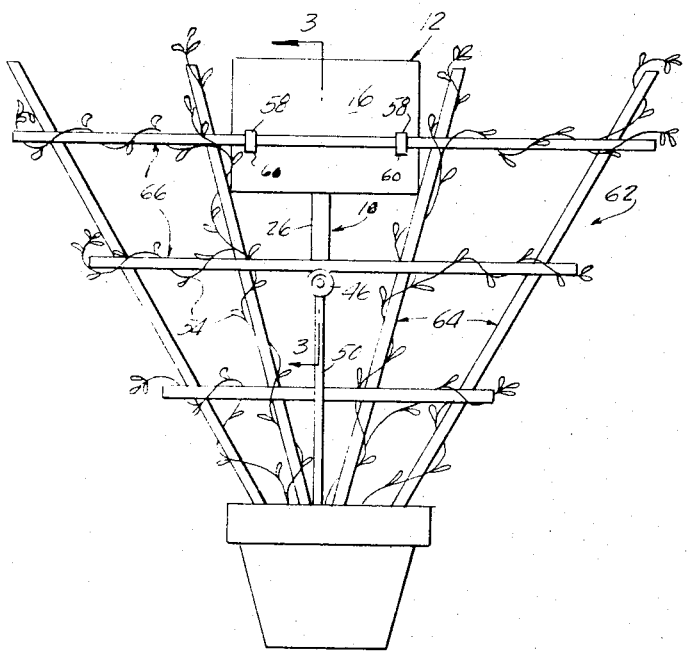
FIGURE 1 is a front elevational view of one embodiment of this invention illustrating the watering system and plant support means in association with a potted plant.
Figure 2:
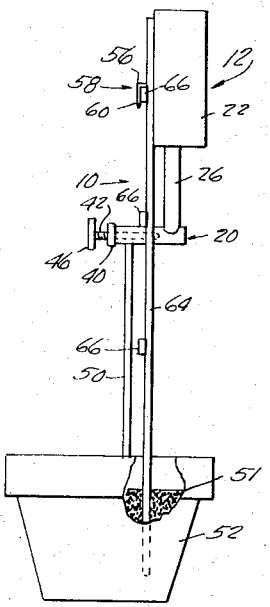
FIGURE 2 is a side elevational view of the watering system and plant support means shown in FIGURE 1.
Figure 3:
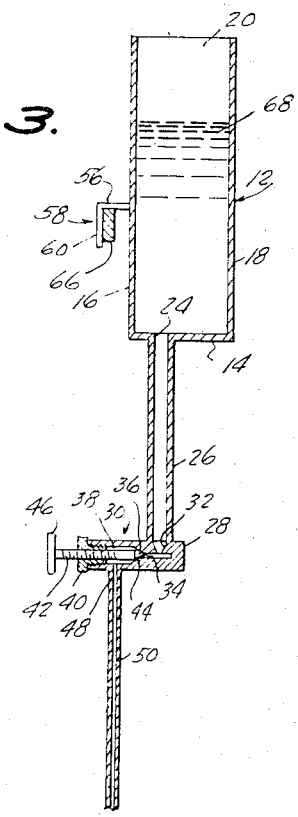
FIGURE 3 is a detail fragmentary vertical transverse cross-sectional view, FIGURE 3 being taken substantially on the vertical plane of line 3—3 of FIGURE 1, looking in the direction of the arrows.

Referring now more specifically to the drawings, reference numeral 10 denotes, in general, one of two watering systems constructed in accordance with the teachings of this invention for watering potted plants. This system as shown in FIGURES 1 to 3, inclusive, comprises a horizontally-elongated substantially hollow rectangular water-receiving reservoir or header 12 having an elongated normally horizontal substantially rectangular base wall 14 from the peripheral marginal edges of which arise a pair of elongated, laterally-spaced and substantially parallel rectangular sidewalls 16, 18, and a pair of longitudinally-spaced substantially parallel rectangular end walls 18, 20. As is seen in FIGURE 3, that end of the reservoir 12 opposite the base wall 14 is open, and the base wall 14 intermediate its ends and proximate to, but spaced inwardly from the sidewall 16 is provided with a water outlet opening 24.

One end of an elongated hollow rigid cylindrical conduit 26 is fixedly-connected to the base wall 14 by conventional means (not shown) and is in open communication with the opening 24. As is seen in the several figures of the drawings, the other end of the conduit 26 projects laterally away from the base wall 14 at substantially right angles with respect thereto and is fixedly-connected to one end of the main body portion 28 of a conventional needle valve assembly or fitting 30.

The aforementioned other end of the conduit 26 is in open communication with the inlet port 32 of the valve assembly 30, and the inlet port 30 connects with one end of an internal axially-extending passage 34, the other end of the latter being in open communication with a typical conical valve seat 36. In the conventional manner, the valve seat 36 is in open communication with one end of an enlarged axially-extending internal chamber 38, the other end of the chamber 38 being closed by a conventional fitting 40 through which is threaded the elongated stem 42 having a needle valve 44 at one end thereof which is adapted to seat, when moved to its closed position, in the valve seat 36. The other end of the stem 42 has fixedly-secured thereto the usual and conventional manually-manipulative control knob 46.

The valve assembly 30 also includes the usual outlet port 48 which is in open communication at one of its ends with the chamber 38 and, as is seen in FIGURE 3 of the drawings, one end of an elongated substantially hollow rigid cylindrical conduit 50 is fixedly-secured to the main body portion 28 at the peripheral marginal edge of the outlet port 48. The other end of the conduit 50 projects radially away from the main body portion 28 and is adapted to be inserted within soil 51 disposed within a conventional flower pot 52 in which plants 54 (see FIGURE 1) are grown.

Optionally, but preferably, the sidewall 16 has secured thereto one end of the feet portions 56 of a pair of longitudinally-spaced and horizontally-aligned inverted substantially L-shaped brackets 58. The feet portions 56 project laterally from the sidewall 16 at substantially right angles with respect thereto, and their respective other ends are fixedly-secured to depending leg portions 60 disposed in laterally-spaced and substantially parallel relationship relative to the sidewall 16.

Reference numeral 62 denotes, in general, a trellis work or lattice which includes a plurality of upright elongated rigid leaders 64 which, preferably, diverge upwardly away from the pot 52. The leaders 64 are desirably coplanar and have fixedly-secured thereto a plurality of vertically-spaced and substantially parallel stringers 66 which are also, preferably, but not necessarily, disposed in a common plane.

The lower end of the conduit 50 and the lower ends of the leaders 64 are all firmly embedded within the soil contained within the port 52 to prevent inadvertent or accidental displacement of the same should the pot 52 be offered a jarring movement or any movement in transport which would tend to dislodge the same. To form a more rigid construction, the brackets 58 are hooked over one of the stringers 66 to prevent the reservoir 12 from moving from its normal upright position shown in FIGURES 1 and 2 to another position angularly-inclined relative to the plane of the leaders 64 whereby the weight of the water in the reservoir 12 would tend to permit the device 10 to overturn.

The receptacle 12 is, as has been described above, adapted to receive water indicated by reference numeral 68 therein, although the water 68 may be displaced by any suitable liquid, such as, for example, the conventional liquid plant foods.

To use the watering system 10, it is only necessary that the receptacle or reservoir 12 be filled to any desirable height and the needle valve 44 backed away from its seat 36 that distance necessary to provide a substantially continuous supply of liquid through the conduit 26, the needle valve 30 and the conduit 50 to the soil in which the aforementioned other end of the conduit 50 is embedded and in which the plant life 54 grows. The needle valve assembly 30 provides accurate control for the watering of the plant 54 so that the soil in which it is growing is constantly watered with the proper degree of liquid depending upon the nature of the soil, the amount of evaporation of water therefrom, and the demand of the plant, per se.

As the plant life 54 grows, and should it be of a vine type, the vine may be easily trained around and about the leaders and stringers 64, 66, respectively, and in so growing, will tend to conceal the watering system 10. Of course, the degree of concealment will depend entirely upon the number of leaders and stringers 64, 66, respectively, and the amount of foliation of the plant 54, per se.

In FIGURES 4 to 7, inclusive, is illustrated a second embodiment of a watering system constructed according to the teachings of this invention. In these figures, the system is generally indicated at 80 and is seen to include a normally horizontal elongated substantially trapezoidal tray 82 comprising the opposed vertically-spaced and substantially parallel rectangular base and top walls 84, 86, respectively, the base and top walls at one pair of adjacent longitudinally-extending marginal edges being connected by a vertically-extending substantially rectangular side or back wall 88. The other pair of adjacent longitudinally-extending marginal edges of the base and top walls 84, 86 are integrally-connected by a second elongated substantially rectangular side or front wall 90 which, as is seen in FIGURE 6, diverges away from the base wall 84. The opposed ends of the tray 82 are closed by trapezoidal end walls 92, 94 which are fixedly-secured to the adjacent end edges of the base, top and sidewalls by conventional means. Preferably, the top wall 84 is provided with a plurality of longitudinally-spaced, transversely-extending cylindrical openings 96 which are adapted to releasably-receive and support therein, respectively, the inverted frusto-conical sidewalls 98 of a plurality of plant or flower pots 100. These pots 100, as in the preceding embodiment of the invention, contain plant soil 102 the wetted condition of which is to be maintained and controlled by the means to be herein described below.

Reference numeral 104 denotes, in general, an open-ended vertically-elongated substantially hollow rectangular socket disposed centrally of the ends of the tray 82. As is seen in the drawings, the socket 104 includes as a sidewall thereof that portion of the sidewalls 88 linned by a pair of spaced vertically-extending laterally-projecting and substantially parallel end walls 106, 108 and an upright substantially rectangular sidewall 110 fixedly-secured to the outer end edges of the end walls 106, 108 and which is disposed parallel to the sidewall 88.

At 112 is indicated an elongated normally upright substantially rectangular and rigid standard, the lower end of the standard being adapted to be releasably and telescopically-received within the socket 104. The other end of the standard 112 projects laterally away from and extends above the plane of the top wall 86, and this end of the standard 112 has fixedly-secured thereto, at longitudinally-spaced intervals and by conventional means, a plurality of parallel normally horizontal elongated and substantially rectangular stringers 114 that are connected thereto intermediate their respective ends.

Reference numeral 116 denotes an elongated substantially hollow rectangular reservoir or header having an open upper end and which comprises an elongated normally horizontal substantially rectangular base wall 118 to the longitudinally-extending marginal side edges of which are fixedly-secured a pair of elongated, rectangular, laterally-spaced and substantially parallel upright sidewalls 120, 122. From the marginal end edges of the base wall 118 upwardly-project a pair of fixedly-secured substantially rectangular, parallel and longitudinally-spaced end walls 124, 126. As is seen in the several figures of the drawings, the upper end of the standard 112 is fixedly-secured, by conventional means 128, to the underside of the base wall 118 centrally thereof.

At 130 is indicated an elongated header conduit having a conventional needle valve assembly 132 connected at each end thereof, the needle valve assemblies each being of identical construction and including a fitting having a main body portion 134 in which is threadedly-carried the stem 136 having an internally-located needle valve 138 formed at one end thereof for controlling the flow of water or other liquids through the usual outlet port 140. The other end of the stem 136 has fixedly-secured thereto a manually-manipulative knob 142 in the usual manner.

The ports 140 are fixedly-connected to the opposed ends of the rigid conduit 130, as stated above, and these elements are supported from the reservoir 110 by means of a pair of laterally-projecting identical hollow conduits 144 which are, at one of their respective ends, connected with the main body portions 134 of valve assemblies and in open communication with the inlet ports 146 thereof. The other ends of the conduits 134 are in open communication with the interior of the reservoir 116 through the base wall 118 to which they are connected as at 148 and from which they are subtended.

The header conduit 130 extends substantially parallel to that edge of the base wall 118 adjacent the sidewall 20 in inwardly-spaced relation relative thereto and has fixedly-connected thereto a plurality of needle valves 132A at longitudinally-extending regularly-spaced intervals. The valves 132A are identical in construction with respect to the valves 132 and, therefore, require no additional description except to state that in the case of the valves 132A the locations of the inlet and outlet ports have been reversed. Thus, the inlet sides 150 of the valves 132A connect and are in open communication with the header conduit 130, and their respective outlet sides are in open communication and are connected with the upper end of one of a plurality of depending elongated hollow flexible lead conduits 152. The lead conduits 152 have a length sufficient so as to permit their loose intertwinning between the stringers 114 while the other ends thereof extend into the several flower pots 100. The stems of the plants growing in the soil 102 may also be interlaced with the stringers 114 to effectively conceal the lead conduits 152 in the manner stated with respect to the first embodiment of this invention.

The reservoir 116 may, optionally, be provided with an inlet opening 154 (see FIGURE 4) formed in the sidewall 122 adjacent the upper edge thereof, the opening being adapted for connection to one end of a flexible conduit 156, the other end of the latter being provided with a coupler element 158 for connection with the source of liquid supply under pressure.

In the embodiment of the invention illustrated in FIGURES 4 to 7, inclusive, equal liquid pressure throughout the length of the header conduit 130 is practically insured through the liquid feeding thereof at its opposed ends, and in use, the free ends of the flexible conduits 152 are inserted into the flower pots 100 or are embedded into the soil 102 thereof as required for the plant being watered, and the flow through each conduit 152 is individually controlled through its associated valve assembly 132 depending upon the need of each individual plant, the control being effected through the manipulation of the knobs 142A, all in the conventional manner.

In this embodiment of the invention the valve assemblies 132A play a unique part in that when a flower pot 100 is to be removed from the tray 82 the flow of liquid thereto may be cut off by closing the needle valve associated with its lead conduit 152 without interfering with or interrupting the liquid supply to the other flower pots which would normally make it necessary that the flow to the remaining flower ports be subject to readjustment until the optimum operating conditions were again obtained.

When the reservoir 116 is not required, or if the system is to be shipped or stored, the standard 112 may be removed from the socket 104 to facilitate the handling of the component elements of this system or device.

Having described and illustrated two embodiments of this invention in detail, it will be understood that the same area offered merely by way of example, and that this invention is to be limited only by the scope of the appended claims.

What is claimed is:

1. Means for supplying plant life growing in soil disposed in a receptacle with a supply of liquid comprising a liquid-receiving reservoir, rigid means supporting said reservoir in an elevated position above said receptacle, a conduit having an end thereof in open communication with said reservoir and its other end juxtaposed relative to said plant life, and valve means interposed between said ends of said conduit, and wherein said supporting means comprises said conduit, and said other end is embedded in said soil, and auxiliary support means for said reservoir, said auxiliary support means including members each having a pair of ends with lower ends of said members secured in said receptacle and their upper ends being juxtaposed relative to said reservoir, and means mounted on said reservoir for connection with said upper ends of said members.

2. Means as defined in claim 1, wherein said auxiliary support means comprises a plurality of elongated upright leaders and horizontal stringers connected to form a lattice work having opposed upper and lower ends with said lower end connected on said receptacle and its said upper end disposed in spaced juxtaposition relative to said receptacle, and bracket means fixedly-secured to said receptable and projecting laterally therefrom for connection with said lattice work.

3. Means as defined in claim 1, including a normally horizontal tray having means formed therein to receive and removably-support a plurality of said flower pots, said tray having an upwardly-opening socket formed therein and said rigid supporting means comprising an elongated standard having opposed upper and lower ends, said lower end of said standard being releasably-received within said socket with the upper end thereof disposed above said flower pots, a plurality of flexible conduits having one of their respective ends in open communication with said reservoir and their opposed ends depending into said flower pots, and valve means controlling the flow of liquid to said conduits.

4. Means as defined in claim 1, and a tray including a pair of vertically-spaced normally horizontal base and top walls and an upright connecting sidewall therefor, means on said top wall to releasably-receive and support a plurality of said flower pots, said tray having upwardly-opening socket means formed therein, said rigid supporting means comprising an elongated standard having opposed upper and lower ends of which said lower end is releasably-received within said socket, said upper end of said standard terminating at a point above said flower pots, said reservoir including a normally horizontal base wall and a continuous sidewall projecting upwardly from said base wall, means connecting said base wall with said upper end of said standard, a plurality of flexible conduits each having a pair of opposed ends and there being one conduit for each of said flower pots, means connecting one of said ends of said flexible conduits in open communication with said reservoir and the other ends thereof extending, respectively, into one of said flower pots, and individual valve control means for each of said conduits to control the supply of liquid through said conduits.

5. Means as defined in claim 1, and a tray including a pair of vertically-spaced normally horizontal base and top walls and an upright sidewall extending between and connecting said base and top walls, means on said top wall to releasably-receive and support a plurality of said flower pots, said tray having upwardly-opening socket means formed therein, said rigid supporting means comprising an elongated standard having opposed upper and lower ends of which said lower end is releasably-received within said socket, said upper end of said standard terminating at a point above said flower pots, said reservoir including a normally horizontal base wall and a continuous side-wall projecting upwardly from said base wall, means connecting said last-named base wall with said upper end of said standard, an elongated header conduit extending along the peripheral marginal edge of said reservoir and having a pair of opposed ends, valve means for each end, respectively, of said header conduit, said valve means having their respective outlet ports in open communication with said opposed ends of said header conduit, a support and liquid-supply conduit for each of said valves, said support and liquid-supply conduits having one of their respective ends fixedly-secured to the underside of said reservoir base wall and in open communication with said reservoir, said support and liquid-supply conduits having their other ends connected in open communication with the inlet ports, respectively, of said valves, said support and liquid-supply conduits subtending and supporting said header conduit in juxtaposition relative to said sidewall of said reservoir, a plurality of valve means having their respective inlet ports connected on said header conduit and in open communication therewith, and a plurality of flexible leader conduits, there being a leader conduit for each of said flower pots, said leader conduits having one of their respective ends connected with one of said last-named valve means and their other respective ends extending into and in open communication with one, respectively, of said flower pots.

6. Means as defined in claim 5, and an elongated flexible conduit having a pair of opposed ends, means fixedly-connecting one of said ends of said last-named conduit on said reservoir sidewall in open communication therewith and above its said base wall, and means on the other end of said last-named conduit for connection with a source of liquid under pressure.

7. Means as defined in claim 6, and a plurality of normally horizontal stringers extending transversely across and being fixedly-secured to said standard in longitudinally-spaced relationship relative thereto.

References Cited

UNITED STATES PATENTS

| | | | |
|---|---|---|---|
| 2,990,647 | 7/1961 | Himebaugh | 47—47 |
| 3,085,364 | 4/1963 | Chapin | 47—1 |
| 3,108,400 | 10/1963 | Wolfe | 47—38 XR |

FOREIGN PATENTS

| | | |
|---|---|---|
| 178,981 | 11/1935 | Switzerland. |
| 116,795 | 7/1946 | Sweden. |
| 86,675 | 12/1955 | Norway. |
| 1,058,780 | 6/1959 | Germany. |
| 1,217,816 | 12/1959 | France. |
| 958,150 | 5/1964 | Britain. |

ROBERT E. BAGWILL, *Primary Examiner.*